United States Patent [19]
Connor et al.

[11] Patent Number: 5,643,493
[45] Date of Patent: Jul. 1, 1997

[54] COOLANT INHIBITOR CONCENTRATE

[75] Inventors: Kevin C. Connor, Sherwood Park; Eric H. Hillier, St.Albert, both of Canada

[73] Assignee: The Dow Chemical Company, Midland, Mich.

[21] Appl. No.: 615,644

[22] Filed: Mar. 13, 1996

[51] Int. Cl.$^6$ .............................. C09K 5/00; C23F 11/00
[52] U.S. Cl. ................. 252/75; 106/14.17; 106/14.42; 106/14.44; 252/74; 252/390
[58] Field of Search .................. 106/14.17, 14.21, 106/14.41, 14.42, 14.44; 252/75, 390, 74; 422/7, 16

[56] References Cited

U.S. PATENT DOCUMENTS

| | | | |
|---|---|---|---|
| 3,231,501 | 1/1966 | Reese | 252/74 |
| 3,948,792 | 4/1976 | Watsen et al. | 252/181 |
| 4,210,549 | 7/1980 | Hirozawa et al. | 252/76 |
| 4,242,214 | 12/1980 | Lambert, Jr. | 252/75 |
| 4,324,675 | 4/1982 | Barthold et al. | 252/79 |
| 4,448,702 | 5/1984 | Kaes | 252/70 |
| 4,455,248 | 6/1984 | Wood | 252/75 |
| 4,564,465 | 1/1986 | Bibber | 252/390 |
| 4,587,028 | 5/1986 | Darden | 252/76 |
| 4,588,513 | 5/1986 | Triebel et al. | 252/75 |
| 4,647,392 | 3/1987 | Darden et al. | 252/75 |
| 4,851,145 | 7/1989 | Van Neste et al. | 252/75 |
| 4,869,841 | 9/1989 | Matteodo et al. | 252/79 |
| 4,946,595 | 8/1990 | Miller, Jr. | 210/651 |
| 5,366,651 | 11/1994 | Maes et al. | 252/76 |
| 5,422,008 | 6/1995 | Woyciesjes et al. | 210/662 |
| 5,422,026 | 6/1995 | Greaney | 252/73 |

FOREIGN PATENT DOCUMENTS

| | | |
|---|---|---|
| 960937 | 1/1975 | Canada. |
| 990060 | 6/1976 | Canada. |
| 0564721 | 4/1992 | European Pat. Off.. |
| 4117481 | 4/1992 | Japan. |

OTHER PUBLICATIONS

Sotoudeh, "An Amine, Nitrite, Phosphate and Heavy Metal Free Engine Coolant Inhibitor" SAE Technical Paper Series, 930474 (Mar. 1993).

Hudgens, "Phosphate–Molybdate Supplement Coolant Additives for Heavy Duty Diesel Engines", ASTM Publication: 04–011920–15 (1991) No Month.

*Primary Examiner*—Anthony Green
*Attorney, Agent, or Firm*—John B. Treangen

[57] ABSTRACT

The invention described herein is a corrosion inhibitor concentrate, and a method for preparation thereof, which may be formulated free of nitrites, nitrates, amines, and phosphates. The inhibitor concentrate is a "single part" synergistic combination of inhibitors, stabilizers, and anti-foam agents, useful for reinhibition of recycled antifreeze/coolant. The inhibitor concentrate is efficacious for corrosion inhibition in coolants across a broad range of glycol quality. The inhibitor concentrate comprises specific amounts of water, triazole, alkali metal hydroxide, borate, alkali metal silicate, silicate stabilizer, and anti-foaming agent.

25 Claims, No Drawings

COOLANT INHIBITOR CONCENTRATE

BACKGROUND AND SUMMARY OF THE INVENTION

Antifreeze compositions are additives commonly used to lower the freezing point or increase the boiling point of water. Such additives primarily consist of one or more alcohol and/or glycol-based components. Ethylene glycol is the most commonly used antifreeze component. When added to an internal combustion engine cooling system it affords the engine coolant contained therein freeze and antiboil protection (typically between −37° C. to about 115° C., depending on the pressure).

It is known that from the time the antifreeze is added to an aqueous-based engine cooling system the glycol and/or alcohol-based components of the antifreeze start to break down chemically into various organic acids and aldehydes. The organic acids produced are usually glycolic, formic, and to a lesser extent oxalic acids. The breakdown is confirmed by the pH of a traditional phosphate/borate based engine coolant composition decreasing from a pH of about 10.0 downward toward a pH of 7.0. As the pH decreases, corrosion proceeds at a very rapid rate. The less noble metals, such as steel, iron, and cast iron in a coolant system, are the first to go into solution via the corrosion process. Low pH also causes aluminum pitting which readily weakens the wall thickness of its respective components. Copper likewise corrodes and goes into solution. Zinc, used to strengthen silver solder in radiators, leaches out and weakens the solder so that leaks develop. The remaining impurities commonly found are suspended particulate matter primarily corrosion products (metal oxides), dirt, silt, and hard water salt deposits.

To combat the above problems, circulating coolant compositions generally include several known corrosion inhibitors. The inhibitors are added either directly to the coolant or included in an antifreeze solution added thereto which is sold as "inhibited antifreeze". However, a number of commonly accepted corrosion inhibitors have been found to have problems. For example, amines and nitrites are believed to form dangerous nitrosamines when used together. In addition, phosphates have been found to be detrimental to the environment if spent coolant is disposed via waste water treatment systems. Therefore, it is often desirable to have coolants which contain corrosion inhibitors other than nitrites, amines, and phosphates.

An additional problem exists in that, over a period of time, typical corrosion inhibitors such as phosphates, silicates, borates, nitrites, nitrates, azoles, and molybdates are consumed which further contribute to the corrosion effect on the engine system. Furthermore, with time the initial coolant accumulates dissolved impurities and suspended particulate matter and loses effective corrosion inhibition and freeze protection capabilities. For the purpose of replenishing one or more beneficial coolant additives which have been consumed during normal use, supplemental coolant additives (SCA's).are often added to circulating coolants which have been in long term use. Primarily the SCA's are used with heavy duty diesel applications to stop wet sleeve liner pitting (cavitation-corrosion) as well as prevent deposits and scale buildup in the cooling system. Various SCA compositions are disclosed in the following U.S. Pat. Nos.: 3,231,501; 3,962,109; 4,242,214; 4,455,248; 4,564,465; 4,587,028; and 4,588,513 each of which is incorporated in its entirety herein by reference. Typically, such SCA's are added directly to the coolant in the form of a concentrated aqueous solution of the active components of the SCA. For example, diesel truck drivers may be instructed to periodically add defined amounts of such solutions to the cooling systems of their rigs. In certain systems, a solid SCA is included in a circulating coolant filter (see, e.g., U.S. Pat. No. 3,645,402).

Although SCA's may be employed to neutralize degradation products accumulating in the system, these additives are primarily alkaline and include corrosion inhibitors, dispersants, polymers and sequestrants. Generally, however, such compounds do not: restore the depleted antifreeze components (i.e., glycol and/or alcohol); remove the impurities; increase the freeze protection or raise the boiling point of the degraded or used coolant; or inhibit further degradation of the glycol derivative. Therefore, it is generally an accepted practice to remove, replace, and dispose of the coolant composition after a specified period of time.

In many locations, however, antifreeze is considered a hazardous waste and various regulations apply to disposal thereof. In an effort to protect the environment, and as an alternative to disposal, industry continues to develop methods for recycling and reusing such waste products. Examples of such recycling of engine coolants are disclosed in U.S. Pat. Nos. 4,946,595, 4,791,890, 4,793,403, and 5,422,008 (each of which is incorporated herein, in their entirety, by reference). However, reinhibition of recycled antifreeze/coolant formulations presents unique complexities which are substantially different from addition of inhibitors to virgin grade antifreeze/coolant formulations. For example, foaming tendency of recycled glycol can be 20 times greater than that observed for virgin fibre grade ethylene glycol. The unique complexities are due to the chemical and physical characteristics of recycled antifreeze/coolant. Generally, recycled glycol/water solutions contain hard water ions, metal salts, glycol degradation products, and other destabilizing species which can nullify the efficacy of corrosion inhibitors and additives when mixed with inhibitor concentrate. Recycled glycol from spent engine coolant or antifreeze contains heavy metals such as iron, lead, nickel, zinc, and copper. Heavy metals react with and form insoluble salts with corrosion inhibitor anions such as phosphates, borates, silicates, and molybdates. Precipitation causes increased abrasion of cooling system internals, particularly the water pump. Therefore, a need exists for compositions suitable for the replenishment of antifreeze components, such as inhibitors, to the recycled product.

This invention describes a corrosion inhibitor concentrate which may, if desired, be formulated free of nitrites, nitrates, amines, and phosphates. By "concentrate" it is meant that the composition is substantially free of alcohol/glycol-based freezing depressants such as ethylene glycol and propylene glycol. The inhibitor concentrate may subsequently be mixed with the desired freezing depressant in order to formulate a corrosion inhibited coolant composition. The inhibitor concentrate is a "single part" (i.e. it is not necessary to store specified components separately before use), synergistic combination of inhibitors, stabilizers, and antifoam agents, useful for reinhibition of recycled antifreeze/coolant, which are efficacious across a broad range of recycled glycol quality. Furthermore, due to synergy between the essential components of the inhibitor concentrate, the inhibitor concentrate also demonstrates good shelf life. The inhibitor concentrate comprises specific amounts of water, triazole, alkali metal hydroxide, borate, alkali metal silicate, silicate stabilizer, and anti-foaming agent. An additional aspect of this invention includes a process for preparing the inhibitor concentrate.

DETAILED DESCRIPTION OF THE INVENTION

The corrosion inhibitor concentrate of this invention requires an amount of water from 20, preferably 25, to 90, preferably 40 weight percent (wt %). Unless stated otherwise herein, all references to wt % shall mean the weight percent of the noted component based on a total weight of the corrosion inhibitor concentrate when completely formulated as the concentrate. Preferably, the water is substantially free of metal ions, chlorides, sulfates, carbonates, or other undesirable contaminants. More preferably, the water is distilled, deionized, and/or an equivalent thereof.

A second required component of this invention is a triazole. The triazole is provided in an amount of from 1, preferably 4, to 10, preferably 6 wt %. The triazole is preferably tolytriazole or its alkali metal salt, such as sodium tolytriazole. An advantageous means for providing the triazole is in solution with water. For example, a preferred method is to form a solution of 50 volume percent sodium tolytriazole in water. This solution may then be added to the corrosion inhibitor concentrate.

A third required component of this invention is an alkali metal hydroxide. The alkali metal hydroxide is provided in an amount sufficient to provide an acceptable pH in the resulting coolant formulation after the corrosion inhibitor has been diluted with glycol. The preferred pH in the resulting coolant formulation is from about 10 to about 11. Therefore, it is desirable that the amount of alkali metal hydroxide in the corrosion inhibitor concentrate is sufficient to provide a pH of greater than 10 and preferably from 11 to 14 in the concentrate. Advantageous alkali metals for use in the alkali metal hydroxide are sodium, potassium, and mixtures thereof. Potassium metal hydroxide should be used for pH control if sodium metal salts are to be used for addition of other components. This is because the solubility of an all sodium ion concentrate is less than that for an all potassium or mixed potassium and sodium concentrate. Lower solubility will impact concentrate stability. A preferred means for providing the alkali metal hydroxide is in solution with water. For example, a desirable method is to form a solution of 45 volume percent potassium hydroxide in water. This solution may then be added to the corrosion inhibitor concentrate.

A fourth required component of this invention is a borate. The borate is provided in an amount (calculated as $B_2O_3$) of from 3, preferably 12, to 25, preferably 22 wt %. The borate is preferably provided to the concentrate from a source of borate selected from boric acid, alkali metal borate, and alkali metal metaborate. The alkali metal is preferably selected from sodium, potassium, and mixtures thereof. The more preferred borate is sodium tetraborate pentahydrate ($Na_2B_4O_7 \cdot 5H_2O$).

A fifth required component of this invention is an alkali metal silicate. The alkali metal silicate is provided in an amount (calculated as an equivalent amount of silicate in sodium metasilicate pentahydrate) of from 1, preferably 3.5, to 15, preferably 10 wt %. The alkali metal is preferably selected from sodium, potassium, and mixtures thereof. An advantageous means for providing the alkali metal silicate is in solution with water. For example, a preferred method is to form a solution with water such that a resulting ratio of $SiO_2:Na_2O:H_2O$ is about 3.22:1:7. This solution may then be added to the corrosion inhibitor concentrate.

A sixth required component of this invention is a silicate stabilizer. The silicate stabilizer is provided in an amount from 0.1, preferably 0.3, to 5, preferably 1.0 wt %. The purpose of the silicate stabilizer is as an anti-gelling compound. Examples of such compounds are disclosed in a patent issued to The Dow Chemical Company (U.S. Pat. No. 4,333,843), which is incorporated herein by reference. A preferred silicate stabilizer is a silicon phosphonate compound. A commercially available example of the preferred silicon phosphonate compound is available as Dow Corning Q1-6083.

A final required component of this invention is an anti-foaming agent. The anti-foaming agent is provided in an amount from 0.02, preferably 0.05, to 5, preferably 0.5 wt %. Examples of such agents are disclosed in a patent issued to The Dow Chemical Company (U.S. Pat. No. 4,287,077), which is incorporated herein by reference. These compounds are also useful in providing additional silicate stabilization. A preferred anti-foaming agent is a polymeric siloxane compound. A commercially available example of the preferred polymeric siloxane compound is Dow Corning 2-5067.

An optional component which may be useful in the automotive inhibitor concentrate is a hard water stabilizer. The hard water stabilizer is effective in preventing hard water ions such as calcium, magnesium, and iron from precipitating alkaline inhibitors such as silicate and borate. Typical stabilizers work by sequestering hard water ions. A preferred hard water stabilizer is a water soluble polyacrylate compound. Generally, the water soluble polyacrylate compound is provided in an amount of from 0.5, preferably 2, to 5, preferably 4 wt %. Examples of water soluble polyacrylate compounds include ACUMER™ 1100, ACUMER™ 3100 (both available from Rhom & Haas), and POC 2020 HS (available from Degussa Chemical). Of these, ACUMER™ 1100 is preferred.

Another optional component is a water soluble colorant. The colorant is often fluorescent so that it facilitates the finding of cooling system leaks during operation. For example, both GM 1825 and GM 1899 specifications for automotive and diesel engine coolants, respectively, specify a mixture of alizarin cyanin green (e.g. Acid Green 25) and fluorescein (e.g. Acid Yellow 73). It is desirable that the colorant is stable upon exposure to heat and UV radiation, It should be provided in an amount sufficient to impart a distinct color to the corrosion inhibitor concentrate. Preferably, it should be provided in an amount sufficient to impart a distinct color to an engine coolant formulation which contains the corrosion inhibitor concentrate of this invention. Such an amount typically is from 0.5 to 1.5 wt %, based on the total weight of the corrosion inhibitor concentrate. Preferred examples of the water soluble colorant include alizarin cyanin green, Fluorescein, and Rhodamin dyes. Most preferred is a mixture of Acid Green 25 and Acid Yellow 73, commercially available from Chromatech Incorporated as 15% OEM Green Liquid Dye.

Another optional component is an alkali metal nitrate. Alkali metal nitrates typically provide increased pitting protection for aluminum and serve to enhance the basic formulation described above. It is desirable to add alkali metal nitrates whenever enhanced aluminum corrosion protection is required such as for automotive engine applications using aluminum cylinder heads. Preferably, the alkali metal nitrate is provided in an amount between 0, preferably 4.5, and 10, preferably 6 wt %. The alkali metal is preferably selected from sodium, potassium, and mixtures thereof, wherein sodium is the most preferred.

Another optional component is an alkali metal molybdate. Alkali metal molybdates typically provide increased cavitation-erosion protection for cast iron cylinder liners, especially in combination with nitrite, and this serves to enhance the basic formulation described above. It is desirable to add alkali metal molybdates whenever enhanced cylinder liner protection is required such as for heavy duty diesel engine applications. For example, the Truck Maintenance Council (TMC) recommended practice RP 329 governing heavy duty diesel fleet management requires combined molybdate (as $MoO_4^{-2}$) and nitrite (as $NO_2^-$) concentration to be more than 1560 ppm, with a minimum of 600 ppm of either. With the corrosion inhibitor concentrate of this invention, the alkali metal molybdate is preferably provided in an amount between 0, preferably 3, and 7, preferably 5 wt %. The alkali metal is preferably selected from sodium, potassium, and mixtures thereof, wherein sodium is the most preferred. Most preferably, the alkali metal molybdate is provided in the form of sodium molybdate dihydrate ($Na_2MoO_4 \cdot 2H_2O$).

Another optional component is an alkali metal nitrite. Alkali metal nitrites, like alkali metal molybdates, typically provide increased cavitation-erosion protection for cast iron cylinder liners. It is desirable to add alkali metal nitrites whenever enhanced cylinder liner protection is required such as for heavy duty diesel engine applications. For example, the Truck Maintenance Council (TMC) recommended practice RP 329 governing heavy duty diesel fleet management requires nitrite (as $NO_2^-$) concentration to be more than 2400 ppm when no amount of molybdate is added. With the corrosion inhibitor concentrate of this invention, the alkali metal nitrite is preferably provided in an amount between 0, preferably 8.5, and 25, preferably 12 wt %. The alkali metal is preferably selected from sodium, potassium, and mixtures thereof, wherein sodium is the most preferred.

It has been discovered to be desirable to formulate the corrosion inhibitor concentrate of this invention using a specific process. The first step of this process comprises adding into a first vessel, and mixing for a period of time sufficient to ensure complete dissolution, of all contents of the first vessel the following components: a first aliquot of the water in an amount from 20 to 90 wt %; the triazole a first aliquot of the alkali metal hydroxide in an amount from 2 to 20 wt %; and the borate. Generally, each component is fully dissolved before proceeding to the next component addition. If it is desired, the optional alkali metal nitrate, molybdate, and nitrite may also be added during this first step as additional components. A second step of the process comprises adding into a second vessel, and mixing for a period of time sufficient to ensure complete dissolution, of all contents of the second vessel the following components: the alkali metal silicate; a second aliquot of water in an amount between 0 and 10 wt %; a second aliquot of alkali metal hydroxide in an amount between 0 and 5 wt %; and the silicate stabilizer. A third step comprises adding the contents of the second vessel to the contents of the first vessel and mixing to form a combined mixture. The final step comprises adding the antifoam to the combined mixture and mixing for a period of time sufficient to ensure complete dissolution. If it is desired, the optional water soluble colorant and polyacrylate may be added during this final step before the mixing.

The corrosion inhibitor concentrate of this invention may then be mixed with alcohol freezing depressants such as ethylene glycol, propylene glycol, and mixtures thereof, to form a corrosion inhibited engine coolant formulation. The components of the corrosion inhibitor concentrate have been discovered to perform in an especially synergistic manner when used for reinhibiting recycled alcohol freezing depressants from antifreeze/coolants. The corrosion inhibitor concentrate of this invention has been tested in a variety of ethylene glycol streams obtained by recycling spent engine coolant using a variety of commercially available processes such as: industrial scale distillation, portable (garage unit) distillation, nano-filtration, ion exchange, and chemical treatment with filtration. In all cases, addition of the corrosion inhibitor concentrate to recycled ethylene glycol produced an engine coolant which satisfied all performance requirements listed by ASTM D3306-95 and D5345-95.

The concentration of alcohol freezing depressant present in spent engine coolant typically ranges from 25 to 60 volume percent. Coolant recycling technology based on distillation will typically increase the glycol concentration to a range of 75 to 100 volume percent. Most recycling technologies produce a concentration of alcohol freezing depressant of 40 to 60 volume percent solution with water. The corrosion inhibitor concentrate may then be mixed with the solution in an amount sufficient to provide desirable corrosion inhibiting properties. For example, in a 50 volume percent ethylene glycol in water solution, the corrosion inhibitor concentrate may be provided in an amount sufficient to provide a volume-volume ratio of the concentrate to the glycol solution of from 1:48 to 1:72, with the most preferred ratio being 1:60. Such a ratio has been found to yield an engine coolant or antifreeze which satisfies ASTM D5345-95. Other ratios may be used for different volume percents of ethylene glycol or for different alcohol freezing depressants, such as propylene glycol. Typically, however, a weight-weight ratio of corrosion inhibitor concentrate to pure freezing point depressant (whether EG, PG, or other) of about 1:20 to 1:30, preferably 1:22 to 1:28, with the most preferred ratio being about 1:25, yields an engine coolant or antifreeze which satisfies industry accepted performance standards such as ASTM.

EXAMPLES

The invention will be further clarified by a consideration of the following examples, which are intended to be purely exemplary of the use of the invention.

Example 1

An automotive inhibitor concentrate was prepared using the components and procedure described below:

| Component | Wt % amount (grams per 100 grams of final product) |
| --- | --- |
| 1. distilled water (aliquot #1) | 32.4 |
| 2. $NaNO_3$ | 5.2 |
| 3. 50% sodium tolytriazole | 5.2 |
| 4. 45% KOH (aliquot #1) | 17.7 |
| 5. $Na_2B_4O_7 \cdot 5H_2O$ | 19.5 |
| 6. sodium silicate solution N | 7.7 |
| 7. distilled water (aliquot #2) | 5.7 |
| 8. 45% KOH (aliquot #2) | 2.2 |
| 9. Dow Corning Q1-6083 | 0.52 |
| 10. Dow Corning 2-5067 | 0.26 |
| 11. ACUMER 1100 | 2.6 |
| 12. 15% OEM green dye | 0.8 |

Procedure

In a first vessel (#1), the first aliquot of water, followed by the nitrate, the tolyltriazole, the first aliquot of alkali metal hydroxide and finally the borate were added. Each component was fully dissolved before proceeding to the next. The contents in vessel #1 were maintained above a temperature of 35° C. and mixed overnight to ensure complete dissolution.

In a separate vessel (#2), the alkali metal silicate, the second aliquot of water, the second aliquot of alkali metal hydroxide, and the silicate stabilizer (anti-gelling agent) were added. Each component was fully dissolved before proceeding to the next. After the components of both vessels were dissolved, the contents of vessel #2 were added to vessel #1 and mixed. Finally, the antifoaming agent, the polymeric hard water stabilizer, and the dye were added to vessel #1 and thoroughly mixed to produce the automotive inhibitor concentrate.

When diluted with virgin ethylene glycol and water in a ratio of 1 part inhibitor concentrate to 60 parts 50% glycol/water solution on a volume-volume basis, an antifreeze/coolant having a pH between 10 to 11 and satisfying ASTM D4656-95 (automotive and light duty diesel) performance standard was produced. See Example 3 for specific performance data.

Example 2

A heavy duty diesel inhibitor concentrate was prepared using the components and procedure described below. Nitrite and molybdate were added to satisfy typical heavy duty diesel OEM demands:

| Component | Wt % amount (grams per 100 grams of final product) |
|---|---|
| 1. distilled water (aliquot #1) | 34.0 |
| 2. $Na_2MoO_4.2H_2O$ | 3.9 |
| 2. $NaNO_3$ | 3.9 |
| 5. $NaNO_2$ | 10.4 |
| 3. 50% sodium tolytriazole | 5.2 |
| 4. 45% KOH (aliquot #1) | 14.4 |
| 5. $Na_2B_4O_7.5H_2O$ | 15.6 |
| 6. sodium silicate solution N | 4.4 |
| 7. distilled water (aliquot #2) | 3.6 |
| 8. 45% KOH (aliquot #2) | 1.3 |
| 9. Dow Corning Q1-6083 | 0.52 |
| 10. Dow Corning 2-5067 | 0.26 |
| 11. ACUMER 1100 | 2.6 |
| 12. 15% OEM green dye | 0.8 |

Procedure

In a first vessel (#1), the first aliquot of water, followed by the molybdate, the nitrate, the nitrite, the tolyltriazole, the first aliquot of alkali metal hydroxide, and finally the borate were added. Each component was fully dissolved before proceeding to the next. The contents in vessel #1 were maintained above a temperature of 35° C. and mixed overnight to ensure complete dissolution.

In a separate vessel (#2), the alkali metal silicate, the second aliquot of water, the second aliquot of alkali metal hydroxide, and the silicate stabilizer (anti-gelling agent) were added. Each component was fully dissolved before proceeding to the next. After the components of both vessels were dissolved, the contents of vessel #2 were added to vessel #1 and mixed. Finally, the antifoaming agent, the polymeric hard water stabilizer, and the dye were added to vessel #1 and thoroughly mixed to produce the heavy duty diesel inhibitor concentrate.

When diluted with virgin ethylene glycol and water in a ratio of 1 part inhibitor concentrate to 60 parts 50% glycol/water solution on a volume-volume basis, an antifreeze/coolant satisfying ASTM D5345-95 (heavy duty diesel) performance standard is produced. Specifically the following results illustrate typical performance of a coolant prepared from Heavy Duty Diesel Inhibitor Concentrate, above:

| Test Method | Results |
|---|---|
| ASTM D1881 Foaming tendency | <5 sec (break time) |
| | <50 mL (foam volume) |
| ASTM D1287-91 pH | 10 to 11 (50% solution) |
| ASTM D4340-89 heat rejecting aluminum | 0.11 mg/cm$^2$/week |
| ASTM D1384-89 glassware corrosion testing | Cu = +3.0 mg; solder = 17.9 mg; brass = +0.1 mg; steel = +0.3 mg; cast iron = +0.1 mg; Al = +0.1 mg |
| ASTM D2809-94 Al water pump cavitation | 9 rating |

Example 3

The coolant inhibitor concentrate of Example 1 (hereinafter "Inhib. Conc.") is mixed with a solution of antifreeze grade ethylene glycol (EG) (virgin or reclaimed) and water such that the coolant inhibitor concentrate is present by weight in an amount of 1 part inhibitor concentrate to 25 parts pure EG. For example, in a 100 gram solution of EG in water, if 33 grams is determined to be pure EG, then approximately 1.32 grams of inhibitor concentrate is added to the solution. Performance data utilizing various sources of EG (as set forth below in Tables 1) is set forth in Tables 2 through 6.

TABLE 1

Characterization of Glycol Quality Used For Evaluation in Tables 2 through 6
This table represents a compositional analysis of commercially available, ethylene glycols, including "virgin" EG and various recycled glycols. The recycled glycols (identified as "A" through "G") were each independently produced from a standard spent coolant using different methods of recycle such as distillation, nano-filtration, ultra-filtration, ion exchange, and filtration with chemical treatment (in no particular corresponding order). The table represents concentration in parts per million (PPM) unless otherwise indicated.

| TEST | VIRGIN | A | B | C | D | E | F | G |
|---|---|---|---|---|---|---|---|---|
| % MEG | >99.9 | 55 | 98.7 | 84 | 36.5 | 56 | 35.7 | 50 |
| formic acid | — | 232 | <25 | 62 | 103 | 159 | 50 | 114 |
| glycolic acid | — | 1040 | <25 | <25 | 334 | 758 | <10 | 494 |
| acetic acid | <20 | — | — | — | 69 | — | <10 | — |
| total aldehydes | <10 | — | — | 32 | 13 | 19 | 9.9 | — |
| copper | — | 0.2 | — | 13 | — | 0.4 | 1.0 | 2.5 |
| iron | <0.1 | 0.3 | — | — | — | — | 3.7 | 0.9 |
| lead | — | 1.3 | — | — | — | — | 0.9 | 0.4 |
| zinc | — | 0.5 | — | 1.8 | — | 0.5 | 0.5 | 0.8 |
| aluminum | — | 0.8 | — | — | — | — | 0.6 | 3.4 |
| phosphorus | — | 643 | — | — | 30 | 913 | 4.8 | 410 |
| boron | — | 312 | 5 | 13.4 | 315 | 369 | 298 | 180 |
| molybdenum | — | 52 | — | — | 2.3 | 161 | 2.3 | 4.7 |
| silicon | — | 20 | 62 | — | 26 | 32.4 | 26 | 26 |
| calcium | — | 1.0 | 0.3 | 0.3 | 0.3 | 1.4 | 0.3 | 1.2 |
| magnesium | — | 0.7 | 0.2 | 0.1 | — | 0.9 | 0.4 | 2.0 |
| dissolved solids | — | 17300 | 225 | 220 | 8100 | 16500 | 655 | 7300 |
| suspend solids | — | 9 | — | — | — | — | 34 | 36 |
| chloride | <0.1 | 29 | <25 | <25 | 104 | <25 | — | 66 |
| sulfate | — | 237 | <25 | 31 | <25 | 396 | — | 139 |
| nitrate | — | 945 | <25 | <25 | 658 | 1635 | 130 | 432 |
| nitrite | — | 50 | <25 | <25 | 38 | 196 | 92 | 35 |
| tolyltriazole | — | 130 | 43 | <25 | 393 | 1198 | 32 | 180 |
| MBT | — | — | — | — | <25 | — | <5 | — |
| benzoate | — | 384 | — | — | 874 | 340 | — | 69 |

TABLE 2

Corrosion of Cast Aluminum Alloys in Engine Coolants Under Heat Rejecting Conditions
This table reprsents three separate runs of a test of resultant coolants produced by addition of the corrosion inhibitor concentrate to the various sources of EG (as specifically set forth in "Table 1"). The table reflects the weight loss in mg/cm²/week of aluminum alloy SAE 329 as per the test conditions set forth in ASTM D4340-89 (maximum allowable loss = 1.0 mg/cm²/week).

| VIRGIN EG | A | B | C | D | E | F | G | VIRGIN EG* | G* |
|---|---|---|---|---|---|---|---|---|---|
| 0.11 | 0.15 | 0.07 | 0.1 | 0.16 | 0.17 | 0.18 | 0.27 | 0.09 | 0.11 |
| 0.10 | 0.21 | 0.09 | 0.1 | 0.14 | 0.15 | 0.23 | 0.14 | 0.16 | 0.10 |
| 0.06 | | 0.1 | 0.15 | | 0.13 | 0.19 | 0.12 | 0.13 | 0.20 |

*denotes corrosion inhibitor concentrate formulation containing hard water stabilizer

TABLE 3

Corrosion Test for Engine Coolants in Glassware
This table represents the average of three separate runs of a test of resultant coolants produced by addition of the corrosion inhibitor concentrate to the various sources of EG (as specifically set forth in "Table 1"). The table reflects actual weight losses and maximum allowable losses in milligrams for 6 different types of metal alloys as per the test conditions set forth in ASTM D1384-94.

| METAL | MAX | VIRGIN EG | A | B | C | D | E | F | G | VIRGIN EG* | G* |
|---|---|---|---|---|---|---|---|---|---|---|---|
| COPPER | 10 | 2.2 | 3.8 | 1.0 | 1.2 | 1.2 | 1.2 | 0.3 | 3.0 | 2.2 | 3.0 |
| SOLDER | 30 | 0.4 | 0.7 | 1.4 | 0.6 | +0.6 | +0.2 | 1.5 | +1.0 | 0.4 | +1.0 |
| BRASS | 10 | 1.4 | 2.0 | 0.6 | 0.2 | 0.5 | 1.2 | 0.2 | 1.6 | 1.4 | 1.6 |
| STEEL | 10 | 0.1 | +0.8 | 0.4 | +0.1 | +0.1 | 0.2 | 0.2 | 0.9 | 0.1 | 0.9 |
| CAST IRON | 10 | +0.3 | 0.9 | +0.1 | +0.5 | +0.6 | 0.8 | 0.8 | 0.8 | +0.3 | 0.8 |
| ALUMINUM | 30 | +1.9 | +4.6 | +3.6 | +4.5 | +4.3 | +9.8 | +6.0 | +2.8 | +1.9 | +2.8 |

(data are averages of duplicate/triplicate tests)
*denotes corrosion inhibitor concentrate formulation containing hard water stabilizer

TABLE 4

Simulated Service Corrosion Testing of Engine Coolants

This table represents the testing of resultant coolants produced by addition of the corrosion inhibitor concentrate to two sources of EG (i.e. virgin and a recycled glycol identified generically as process G). Specifically this table reflects actual weight losses and maximum allowable losses in milligrams for 6 different types of metal alloys as per the test conditions set forth in ASTM D2570-94

| METAL | MAX | G | VIRGIN | G* |
|---|---|---|---|---|
| COPPER | 20 | 1.0 | 2.6 | 4.0 |
| SOLDER | 60 | 1.8 | 1.9 | 2.0 |
| BRASS | 20 | 1.0 | 1.6 | 7.0 |
| STEEL | 20 | 0.1 | 0.0 | 0.0 |
| CAST IRON | 20 | +0.9 | +0.8 | 0.0 |
| ALUMINUM | 60 | +5.2 | +2.1 | 0.0 |

(data are averages of duplicate/triplicate tests)
*denotes corrosion inhibitor concentrate formulation containing hard water stabilizer

TABLE 5

Cavitation Erosion-Corrosion Characteristics of Aluminum Pumps with Engine Coolants (rating on sacle of 1 to 10)
This table represents the testing of resultant coolants produced by addition of the corrosion inhibitor concentrate to three sources of EG (i.e. virgin and recycled, as specifically set forth in "Table 1" as E and G). The table reflects a rating of the water pump appearance and quality as per the test conditions and rating system set forth in ASTM D2809-94 (minimum acceptable rating is 8).

| PASS | VIRGIN | E | G | VIRGIN* | G* |
|---|---|---|---|---|---|
| 8 min. | 10 | 10 | 10 | 10 | 9+ |

*denotes corrosion inhibitor concentrate formulation containing hard water stabilizer

TABLE 6

Foaming Tendencies of Engine Coolants in Glassware
This table represents the testing of resultant coolants produced by addition of the corrosion inhibitor concentrate to two sources of EG (i.e. virgin and recycled, as specifically set forth in "Table 1" as G). Additionally, data for process G glycol without corrosion inhibitor concentrate is listed for comparison. The table represents an average of three separate runs and reflects the foaming characteristics for the antifreeze composition as per the test conditions set forth in ASTM D1881-86. With respect to foaming tendency, comparison of virgin glycol with the process G glycol reflects an entire range of glycol qualities i.e. from best to worst, respectively.

| PASS | VIRGIN WITH INHIB CONC | G WITHOUT INHIB CONC | G WITH INHIB CONC |
|---|---|---|---|
| Break Time <5 sec | 2.1 sec | >7 sec | 2.4 |
| Volume <150 mL | 35 mL | >450 mL | 40 mL |

The above examples demonstrate that this invention provides desirable corrosion inhibitor properties in antifreeze/coolants using a very broad range of glycol qualities.

Other embodiments of the invention will be apparent to the skilled in the art from a consideration of this specification or practice of the invention disclosed herein. It is intended that the specification and example be considered as exemplary only, with the true scope and spirit of the invention being indicated by the following claims.

What is claimed is:

1. A corrosion inhibitor concentrate comprising:
   (a) from 20 to 90 wt % of water;
   (b) from 1 to 10 wt % of a triazole;
   (c) from 2 to 20 wt % of an alkali metal hydroxide;
   (d) from 3 to 25 wt % of a borate, calculated as $B_2O_3$;
   (e) from 1 to 15 wt % of an alkali metal silicate, calculated as an equivalent amount of silicate in sodium metasilicate pentahydrate;
   (f) from 0.1 to 5 wt % of a silicate stabilizer; and
   (g) from 0.05 to 5 wt % of an anti-foaming agent;
   wherein all wt %'s are based on the total weight of the corrosion inhibitor concentrate.

2. The corrosion inhibitor concentrate of claim 1 wherein the triazole is sodium tolytriazole.

3. The corrosion inhibitor concentrate of claim 1 wherein the alkali metal hydroxide is provided in an amount sufficient to provide a pH of greater than about 10.

4. The corrosion inhibitor concentrate of claim 1 wherein the alkali metal hydroxide is either sodium hydroxide or potassium hydroxide.

5. The corrosion inhibitor concentrate of claim 1 wherein the borate is provided to the concentrate from a source of borate selected from boric acid, alkali metal borate, and alkali metal metaborate.

6. The corrosion inhibitor concentrate of claim 5 wherein the alkali metal metaborate is sodium tetraborate pentahydrate ($Na_2B_4O_7 \cdot 5H_2O$).

7. The corrosion inhibitor concentrate of claim 6 wherein the sodium tetraborate pentahydrate is present in an amount from 12 to 22 wt %, based on the total weight of the corrosion inhibitor concentrate.

8. The corrosion inhibitor concentrate of claim 1 wherein the silicate stabilizer is a silicon phosphonate compound.

9. The corrosion inhibitor concentrate of claim 8 wherein the silicon phosphonate compound is present in an amount from 0.3 to 1.0 wt %, based on the total weight of the corrosion inhibitor concentrate.

10. The corrosion inhibitor concentrate of claim 1 wherein the alkali metal silicate is sodium silicate, potassium silicate, or mixtures thereof.

11. The corrosion inhibitor concentrate of claim 10 wherein the sodium silicate is an aqueous solution having a $SiO_2:Na_2O:H_2O$ ratio of about 3.22:1:7.

12. The corrosion inhibitor concentrate of claim 11 wherein the aqueous sodium silicate solution is present in an amount from 3.5 to 10 wt %, based on the total weight of the corrosion inhibitor concentrate.

13. The corrosion inhibitor concentrate of claim 1 wherein the anti-foaming agent is a polymeric siloxane compound.

14. The corrosion inhibitor concentrate of claim 1 further comprising a water soluble polyacrylate compound which is present in an amount from 0.5 to 5 wt %, based on the total weight of the corrosion inhibitor concentrate.

15. The corrosion inhibitor concentrate of claim 1 further comprising a water soluble colorant which is present in an amount from 0.5 to 1.5 wt %, based on the total weight of the corrosion inhibitor concentrate.

16. The corrosion inhibitor concentrate of claim 1 further comprising an alkali metal nitrate which is present in an amount between 0 and 10 wt %, based on the total weight of the corrosion inhibitor concentrate.

17. The corrosion inhibitor concentrate of claim 1 further comprising an alkali metal molybdate which is present in an amount between 0 to 7 wt %, based on the total weight of the corrosion inhibitor concentrate.

18. The corrosion inhibitor concentrate of claim 1 further comprising an alkali metal nitrite which is present in an amount between 0 and 25 wt %, based on the total weight of the corrosion inhibitor concentrate.

19. An engine coolant formulation comprising an alcohol freezing depressant and a corrosion inhibitor concentrate comprising:

(a) from 20 to 90 wt % of water;

(b) from 1 to 10 wt % of a triazole;

(c) from 2 to 20 wt % of an alkali metal hydroxide;

(d) from 3 to 25 wt % of a borate, calculated as $B_2O_3$:

(e) from 1 to 15 wt % of an alkali metal silicate, calculated as an equivalent amount of silicate in sodium metasilicate pentahydrate;

(f) from 0.1 to 5 wt % of a silicate stabilizer; and (g) from 0.05 to 5 wt % of an anti-foaming agent;

wherein all wt %'s are based on the total weight of the corrosion inhibitor concentrate.

20. The engine coolant formulation of claim 19, wherein the alcohol freezing depressant is a solution containing an amount from 40 to 60 volume percent alcohol freezing depressant in water.

21. The engine coolant formulation of claim 19 wherein the corrosion inhibitor concentrate is present in the engine coolant formulation in a weight-weight ratio to pure alcohol freezing depressant of 1:20 to 1:30.

22. A corrosion inhibitor concentrate comprising:

(a) from 20 to 90 wt % of water;

(b) from 1 to 10 wt % of a triazole;

(c) from 2 to 20 wt % of an alkali metal hydroxide;

(d) from 3 to 25 wt % of a borate, calculated as $B_2O_3$;

(e) from 1 to 15 wt % of an alkali metal silicate, calculated as an equivalent amount of silicate in sodium metasilicate pentahydrate;

(f) from 0.1 to 5 wt % of a silicate stabilizer; and (g) from 0.05 to 5 wt % of an anti-foaming agent;

wherein all wt %'s are based on the total weight of the corrosion inhibitor concentrate, wherein the concentrate is prepared by a process comprising the following steps:

(a) adding a first aliquot of the water in an amount from 20 to 90 wt %, the triazole, a first aliquot of the alkali metal hydroxide in an amount from 2 to 20 wt %, and the borate into a first vessel and mixing for a period of time sufficient to ensure complete dissolution of all contents of the first vessel;

(b) adding the alkali metal silicate, a second aliquot of the water in an amount between 0 and 10 wt %, a second aliquot of the alkali metal hydroxide in an amount between 0 and 5 wt %, and the silicate stabilizer into a second vessel and mixing for a period of time sufficient to ensure complete dissolution of all contents of the second vessel;

(c) adding the contents of the second vessel to the contents of the first vessel and mixing to form a combined mixture; and (d) adding the antifoam to the combined mixture and mixing for a period of time sufficient to ensure complete dissolution.

23. The corrosion inhibitor concentrate of claim 22 wherein step (a) further comprises adding alkali metal nitrate before the mixing.

24. The corrosion inhibitor concentrate of claim 22 wherein step (a) further comprises adding alkali metal molybdate and alkali metal nitrite before the mixing.

25. The corrosion inhibitor concentrate of claim 22 wherein step (d) further comprises adding a water soluble colorant and a water soluble polyacrylate before mixing.

* * * * *